US012643117B2

(12) United States Patent
Katsumura et al.

(10) Patent No.: US 12,643,117 B2
(45) Date of Patent: Jun. 2, 2026

(54) FLYING OBJECT, FLYING OBJECT SYSTEM, AND METHOD FOR PAINTING OBJECT TO BE PAINTED

(71) Applicant: Hitachi, Ltd., Tokyo (JP)

(72) Inventors: Nobuhito Katsumura, Tokyo (JP);
Osamu Uhara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 580 days.

(21) Appl. No.: 17/594,361

(22) PCT Filed: May 8, 2020

(86) PCT No.: PCT/JP2020/018611
§ 371 (c)(1),
(2) Date: Oct. 13, 2021

(87) PCT Pub. No.: WO2020/241198
PCT Pub. Date: Dec. 3, 2020

(65) Prior Publication Data
US 2022/0204160 A1 Jun. 30, 2022

(30) Foreign Application Priority Data
May 29, 2019 (JP) .................................. 2019-100062

(51) Int. Cl.
*B05B 13/00* (2006.01)
*B64D 1/18* (2006.01)
(Continued)

(52) U.S. Cl.
CPC .............. *B05B 13/005* (2013.01); *B64D 1/18* (2013.01); *B64U 10/13* (2023.01); *B64U 30/20* (2023.01);
(Continued)

(58) Field of Classification Search
CPC . B05B 13/005; B05B 7/2491; B05B 12/1472; B05B 7/0025; B05B 7/061;
(Continued)

(56) References Cited

U.S. PATENT DOCUMENTS 8,965,674 B1 * 2/2015 Russell ................... B64C 17/00
701/13
10,011,352 B1 * 7/2018 Dahlstrom ............ B05B 13/005
(Continued)

FOREIGN PATENT DOCUMENTS

CN 204507277 U 7/2015
CN 205971855 U 2/2017
(Continued)

OTHER PUBLICATIONS

International Search Report (PCT/ISA/210) issued in PCT Application No. PCT/JP2020/018611 dated Aug. 4, 2020 with English translation (six (6) pages).
(Continued)

*Primary Examiner* — Anna Thi Ho
(74) *Attorney, Agent, or Firm* — Crowell & Moring LLP

(57) ABSTRACT
A flying object includes: a flying object body; a blade that enables the flying object body to fly; a paint ejection mechanism that ejects paint in a first direction; and a fluid ejection mechanism that ejects a fluid in a second direction differing from the first direction by 90 degrees or more.

15 Claims, 7 Drawing Sheets

(51) Int. Cl.

| | | |
|---|---|---|
| *B64U 10/13* | (2023.01) | |
| *B64U 30/20* | (2023.01) | |
| *B64U 101/28* | (2023.01) | |
| *B64U 101/45* | (2023.01) | |

(52) U.S. Cl.
CPC ...... *B64U 2101/28* (2023.01); *B64U 2101/45* (2023.01); *B64U 2201/00* (2023.01)

(58) Field of Classification Search
CPC .... B64U 2101/28; B64U 10/13; B64U 30/20; B64U 2101/45; B64C 17/08; B64F 3/00; B64D 1/18
USPC .......................................................... 239/66
See application file for complete search history.

(56) References Cited

U.S. PATENT DOCUMENTS

| | | | | |
|---|---|---|---|---|
| 10,112,715 | B2 * | 10/2018 | Whitmarsh | B64D 1/18 |
| 10,124,359 | B2 * | 11/2018 | Raman | B05B 13/005 |
| 10,195,629 | B1 | 2/2019 | Dahlstrom | |
| 10,507,671 | B1 * | 12/2019 | Wang | B41J 11/0022 |
| 10,894,262 | B1 * | 1/2021 | Cooper | B05B 5/1691 |
| 2012/0234233 | A1 * | 9/2012 | Baumann | B05B 9/03 |
| | | | | 138/155 |
| 2015/0274294 | A1 | 10/2015 | Dahlstrom | |
| 2015/0344136 | A1 * | 12/2015 | Dahlstrom | G05D 1/0866 |
| | | | | 239/722 |
| 2016/0082460 | A1 * | 3/2016 | McMaster | B64U 10/14 |
| | | | | 239/722 |
| 2017/0113787 | A1 | 4/2017 | Hein | |
| 2017/0129605 | A1 * | 5/2017 | Wu | B05B 12/02 |
| 2017/0200530 | A1 | 7/2017 | Davis et al. | |
| 2017/0259920 | A1 * | 9/2017 | Lai | G05D 1/0011 |
| 2018/0043386 | A1 * | 2/2018 | Busby | B64C 39/024 |
| 2018/0104705 | A1 * | 4/2018 | Slutskii | C08J 9/141 |
| 2018/0111146 | A1 * | 4/2018 | Strong | B05B 12/085 |
| 2018/0201372 | A1 * | 7/2018 | Miller | B05B 7/1422 |
| 2018/0208307 | A1 * | 7/2018 | Boehme | A47L 1/02 |
| 2019/0001352 | A1 * | 1/2019 | Roy | B05B 12/087 |
| 2019/0118198 | A1 * | 4/2019 | Matlack | B05B 14/30 |
| 2019/0127064 | A1 * | 5/2019 | Beardsley | G05D 1/085 |
| 2019/0247877 | A1 * | 8/2019 | Fideler | B64C 15/00 |
| 2019/0366375 | A1 * | 12/2019 | Thompson | B05B 15/534 |
| 2019/0374966 | A1 * | 12/2019 | Thompson | B05B 15/50 |
| 2020/0197969 | A1 * | 6/2020 | Hegeman | B05B 9/0423 |
| 2020/0222929 | A1 * | 7/2020 | Beardsley | B64U 10/60 |
| 2021/0078028 | A1 * | 3/2021 | Woll | B64D 37/16 |
| 2021/0364176 | A1 * | 11/2021 | Eda | A61H 33/12 |
| 2022/0063806 | A1 * | 3/2022 | Tunovic | B64C 15/02 |
| 2022/0212214 | A1 * | 7/2022 | Kominami | B64C 39/024 |

FOREIGN PATENT DOCUMENTS

| | | | | |
|---|---|---|---|---|
| CN | 107503502 A | 12/2017 | | |
| CN | 107902081 A | 4/2018 | | |
| CN | 208412142 U | 1/2019 | | |
| EP | 3476733 A1 * | 5/2019 | | B64C 39/024 |
| FR | 3 048 415 A1 | 9/2017 | | |
| FR | 3048415 B1 * | 6/2019 | | B64C 39/022 |
| JP | 5-24584 A | 2/1993 | | |
| JP | 2018-90096 A | 6/2018 | | |
| JP | 2019-122893 A | 7/2019 | | |
| KR | 102243390 B1 * | 3/2020 | | B05B 12/004 |
| WO | WO 2016/181426 A | 5/2017 | | |
| WO | WO-2019130317 A1 * | 7/2019 | | A01M 7/00 |
| WO | WO 2019/200497 A1 | 10/2019 | | |
| WO | WO-2020217607 A1 * | 10/2020 | | |

OTHER PUBLICATIONS

Japanese-language Written Opinion (PCT/ISA/237) issued in PCT Application No. PCT/JP2020/018611 dated Aug. 4, 2020 (five (5) pages).

Extended European Search Report issued in European Application No. 20812793.6 dated May 8, 2023 (12 pages).

* cited by examiner

F I G. 1
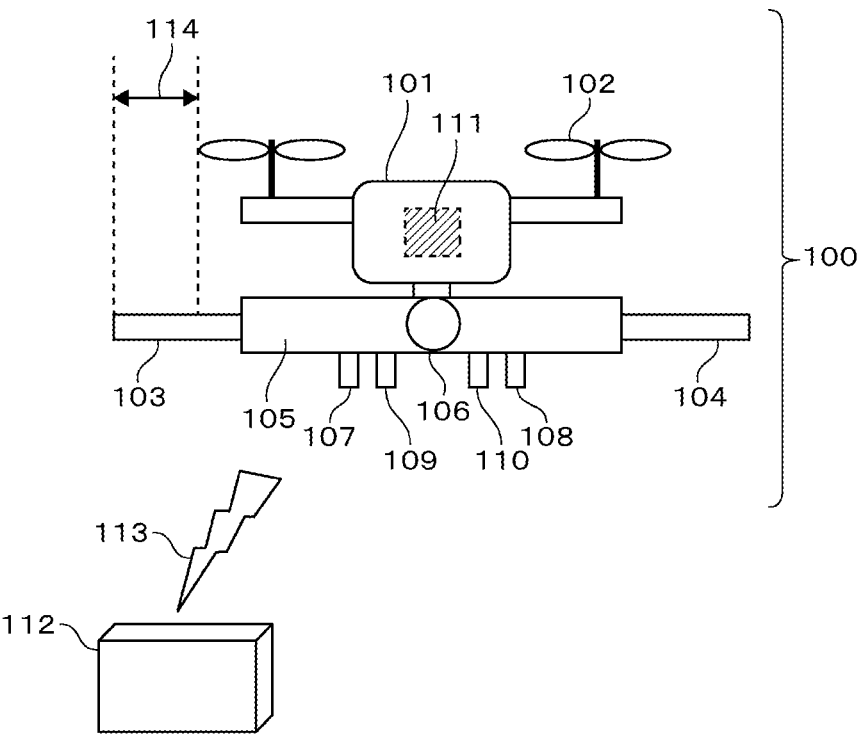
F I G. 2
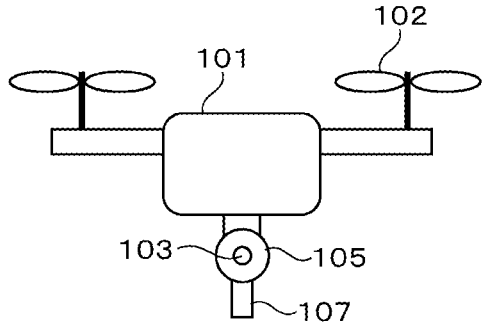

F I G. 3
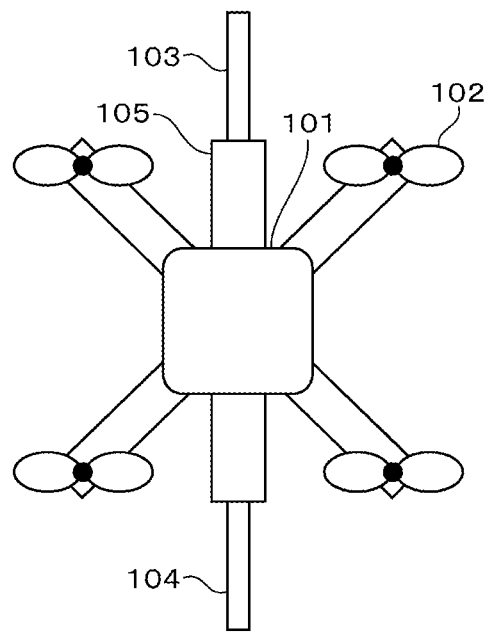
F I G. 4
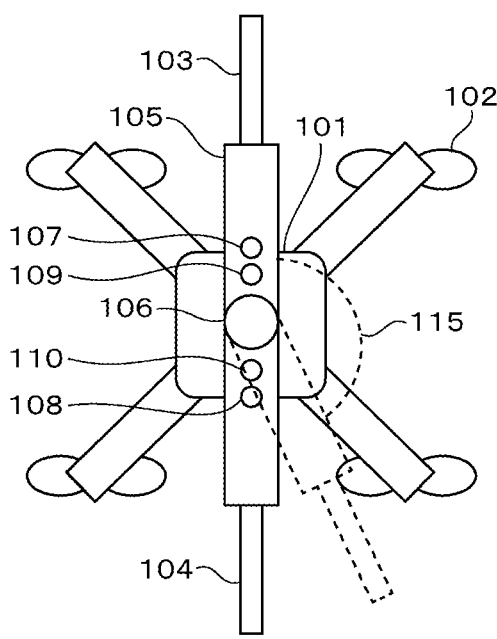

F I G. 5
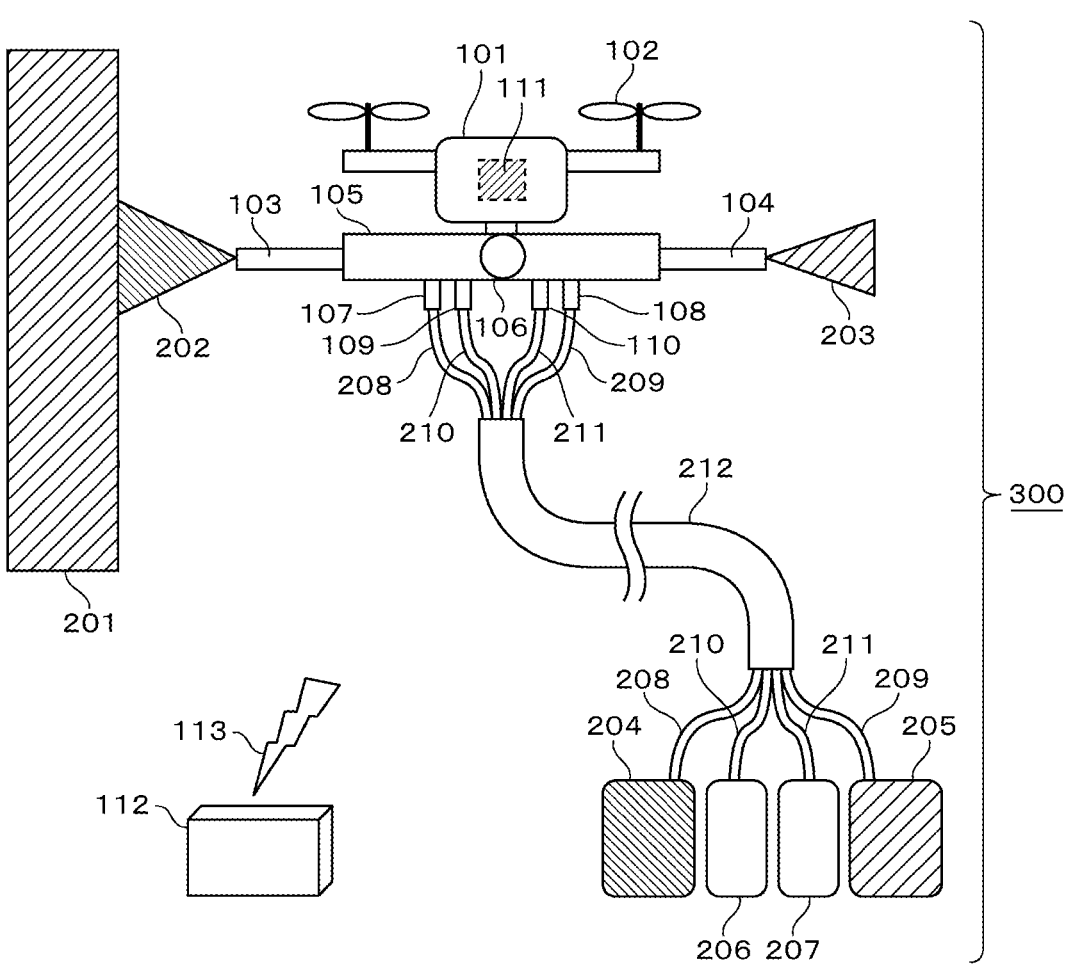

F I G. 6
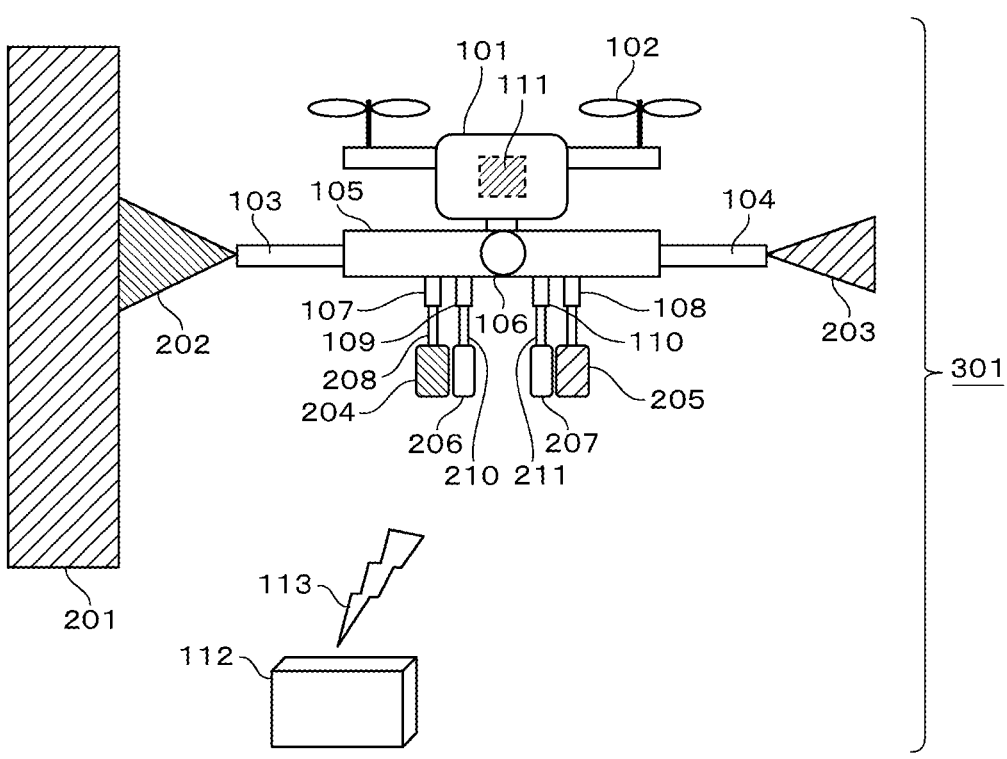

F I G . 7
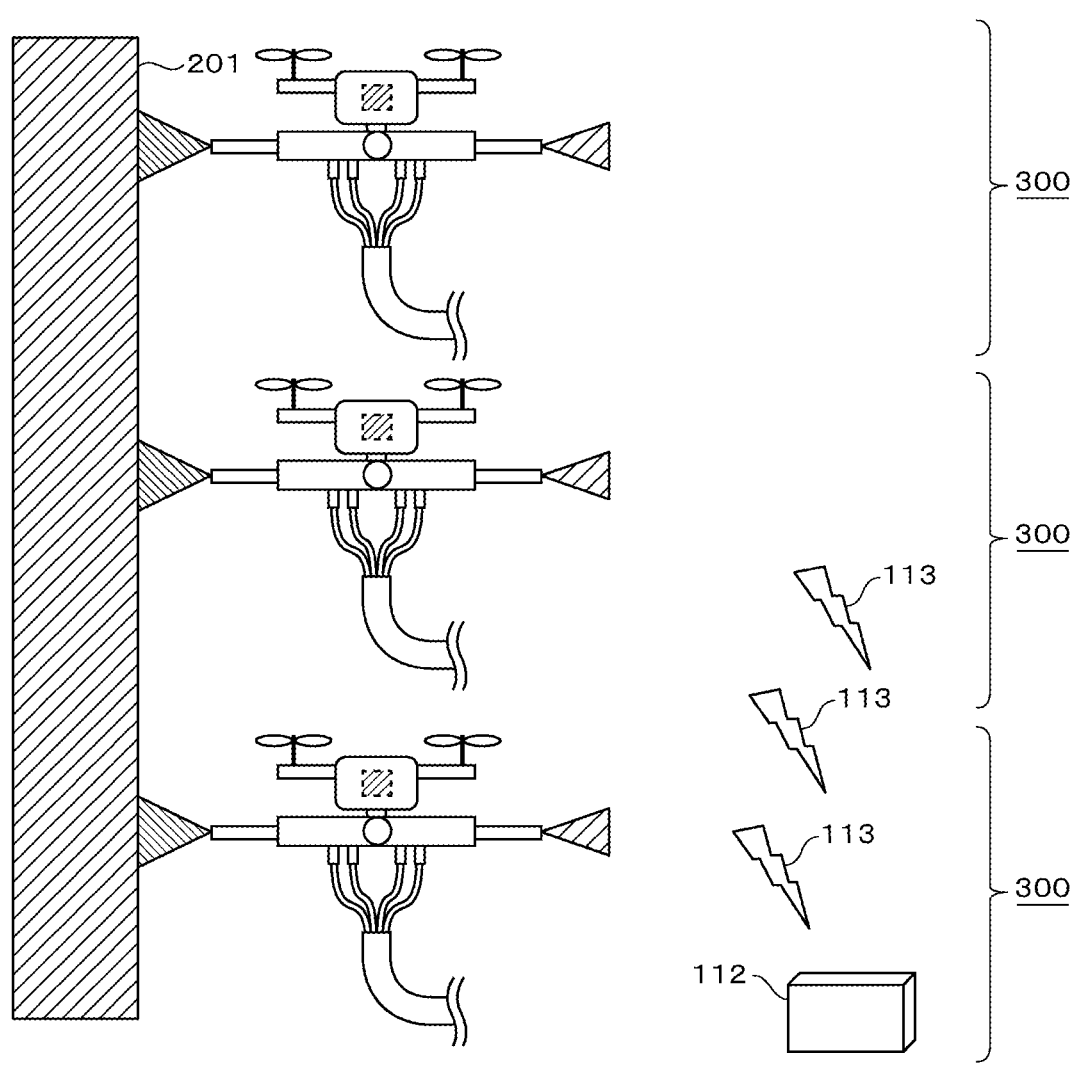

F I G. 8
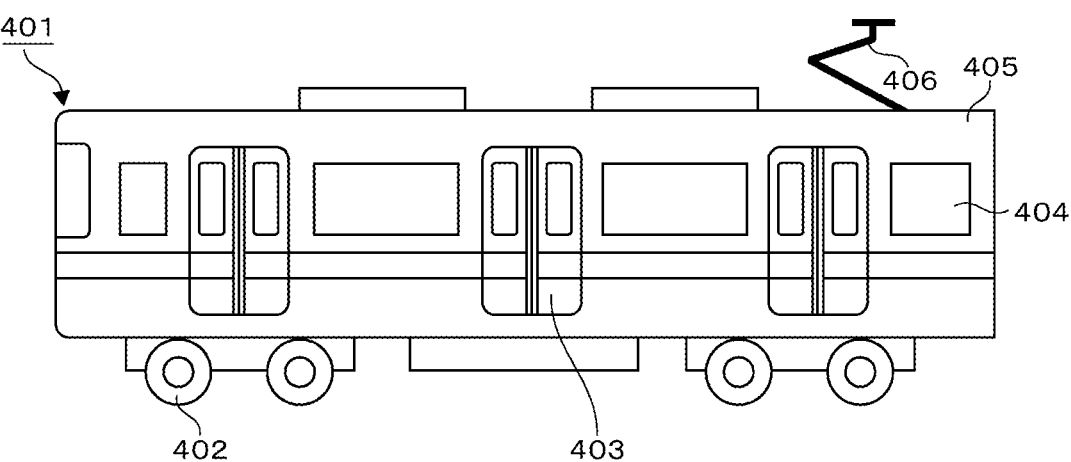

F I G. 9

| | FIRST DISCHARGE PORT — TOPCOAT PAINTING PAINT DISCHARGE RATE (mL/MIN) / AIR USAGE AMOUNT (mL/MIN) | SECOND DISCHARGE PORT — FLUID / DISCHARGE RATE (mL/MIN) / AIR USAGE AMOUNT (mL/MIN) | ANGLE FORMED BY FIRST DISCHARGE PORT AND SECOND DISCHARGE PORT — HORIZONTAL DIRECTION (°) / VERTICAL DIRECTION (°) | METHOD FOR SUPPLYING PAINT TO FLYING OBJECT | APPEARANCE | ADHESION |
|---|---|---|---|---|---|---|
| EXAMPLE 1 | NAX MIGHTY RACK G-II 310 195 | WATER + AIR 310 195 | 180 180 | PRESSURE FEEDING | ○ | ○ |
| EXAMPLE 2 | NAX MIGHTY RACK G-II 310 195 | WATER 311 0 | 180 180 | PRESSURE FEEDING | ○ | ○ |
| EXAMPLE 3 | NAX MIGHTY RACK G-II 310 195 | AIR 0 240000 | 180 180 | PRESSURE FEEDING | ○ | ○ |
| EXAMPLE 4 | NAX MIGHTY RACK G-II 310 195 | ETHYLENE GLYCOL + AIR 290 195 | 180 180 | PRESSURE FEEDING | ○ | ○ |
| EXAMPLE 5 | NAX MIGHTY RACK G-II 310 195 | ALUMINA PARTICLES + AIR 80 195 | 180 180 | PRESSURE FEEDING | ○ | ○ |
| EXAMPLE 6 | NAX MIGHTY RACK G-II 310 195 | ALUMINA DISPERSION SOLUTION + AIR 195 195 | 180 180 | PRESSURE FEEDING | ○ | ○ |
| EXAMPLE 7 | NAX MIGHTY RACK G-II 310 195 | WATER + AIR 358 225 | 180 180 | PRESSURE FEEDING | ○ | ○ |
| EXAMPLE 8 | NAX MIGHTY RACK G-II 310 195 | WATER + AIR 310 195 | 180 180 | SUCTION TYPE PAINT CUP | ○ | ○ |
| EXAMPLE 9 | NAX MIGHTY RACK G-II 310 195 | WATER + AIR 310 195 | 180 180 | PRESSURE FEEDING | ○ | ○ |
| EXAMPLE 10 | NAX MIGHTY RACK G-II 310 195 | WATER + AIR 310 195 | 180 180 | PRESSURE FEEDING | ○ | ○ |
| COMPARATIVE EXAMPLE 1 | NAX MIGHTY RACK G-II 310 195 | NO FLUID IS SPRAYED | - | PRESSURE FEEDING | × | ○ |
| COMPARATIVE EXAMPLE 2 | NAX MIGHTY RACK G-II 20 19 | NO FLUID IS SPRAYED | - | PRESSURE FEEDING | △ | △ |

FLYING OBJECT, FLYING OBJECT SYSTEM, AND METHOD FOR PAINTING OBJECT TO BE PAINTED

TECHNICAL FIELD

The present invention relates to a flying object, a flying object system, and a method for painting an object to be painted.

BACKGROUND ART

Painting is applied to many structures including buildings for the purpose of giving design and protection thereto. Particularly, in moving bodies such as railway vehicles and automobiles, in order to give aesthetics and to reduce aerodynamic resistance, smoothing a surface of a paint film is required. There is a case where the paint film is formed of a single layer, but in order to secure the above characteristics, the paint film is formed of a multi-layer in many cases.

For example, when a paint film is formed on a metal surface, painting is performed to form a number of layers in the following procedure: the application of primer and drying to prevent rust after the roughening of the metal surface by a blasting process, puttying, drying, and polishing to cover roughness of the metal surface so as to secure smoothness, the application of surfacer, drying, and polishing to cover fine roughness of the putty surface, intermediate coat painting, drying, and polishing, and topcoat painting, drying, and polishing to give design to an uppermost surface.

Generally, painting is performed by the hand of a worker, or is performed using an automatic machine such as a robot. When a worker performs painting, the worker uses a spray, a brush, a roller, etc., and in the case of an object to be painted having such a height that the object to be painted cannot be reached by the hand of the worker, installing a scaffolding, etc. is required. In addition, when paint containing an organic solvent, etc. is used, a worker requires wearing protective equipment such as a mask and gloves, so that workability is reduced.

When a robot is used, capital investment is large, and when paint containing an organic solvent is used, a facility conforming to explosion-proof specifications is required, so that the amount of capital investment is further increased. In addition, a place where a robot is to be installed, and a place where the robot is to be retracted or an object to be painted is to be moved and heated when the object to be painted is heated are required.

On the other hand, there is a device that has a high degree of freedom of movement, and that uses a compact flying object to perform painting. For example, as a technique related to painting using a flying object, Patent Document 1 discloses "an airship including: an airship body in which a power supply device, a radio control device, a posture control device, a surveillance television control device are mounted; a balloon coaxially provided in an upper portion of the airship body; arms provided on the airship body radially in all directions to be orthogonal to an axis; a propulsion and posture control blower attached to an end of the same arm so as to be rotatable around an axis of the same arm, and having an axis orthogonal to the axis of the same arm; a level sensor provided in each of the arms; a manipulator attached to the airship body and carrying a surveillance television; and a general work device, an automatic window cleaning device, an automatic painting device, an automatic exterior wall cleaning device, etc. each of which is replaceably attached to a lower portion of the airship body via an attachment fitting".

CITATION LIST

Patent Document

Patent Document 1: JP H5-24584 A

SUMMARY OF THE INVENTION

Problems to be Solved by the Invention

Since the airship of Patent Document 1 includes the balloon having a high volume ratio occupied in the airship and having a small specific gravity, flight stability or posture stability is significantly affected by external disturbances such as wind. In addition, since it takes time to maintain the flight and posture stability of the entire device, the working time is increased accordingly.

An object of the present invention is to secure flight stability of a flying object in a short time.

Solutions to Problems

A flying object according to an aspect of the present invention includes: a flying object body; a blade that enables the flying object body to fly; a paint ejection mechanism that ejects paint in a first direction; and a fluid ejection mechanism that ejects a fluid in a second direction differing from the first direction by 90 degrees or more.

Effects of the Invention

According to one aspect of the present invention, flight stability of the flying object can be secured in a short time.

BRIEF DESCRIPTION OF THE DRAWINGS

FIG. 1 is a side view of a flying object of a first embodiment.

FIG. 2 is a front view of the flying object of the first embodiment.

FIG. 3 is a plan view of the flying object of the first embodiment as seen from above.

FIG. 4 is a plan view of the flying object of the first embodiment as seen from below.

FIG. 5 is a view showing one example in which painting is performed using a painting system including the flying object of the first embodiment.

FIG. 6 is a view showing one example in which painting is performed using the painting system including the flying object of the first embodiment.

FIG. 7 is a view showing one example in which painting is performed using a painting system including a plurality of the flying objects of the first embodiment.

FIG. 8 is a side view of a railway vehicle of a second embodiment.

FIG. 9 is a table showing evaluation results of Examples 1 to 10 and Comparative Examples 1 and 2.

MODE FOR CARRYING OUT THE INVENTION

Hereinafter, embodiments will be described with reference to the drawings.

First Embodiment

A configuration of a flying object of a first embodiment will be described with reference to FIGS. 1 to 4.

A flying object 100 includes a plurality of blades 102 to enable a flying object body 101 to fly. The flying object 100 rotates the blades 102 to fly, and changes the rotation speed to fly while changing the travelling direction and the rising position and speed. A controller 111 installed in the flying object 100 receives radio wave 113 transmitted from an external controller 112, to control the rotation speed of the blades 102. Particularly, the number of the blades 102 is not limited.

The flying object 100 includes a nozzle 105 in a lower portion of the flying object body 101, the nozzle 105 including a first discharge port 103 and a second discharge port 104. The nozzle 105 includes a movable unit 106. The movable unit 106 changes a direction of the second discharge port 104 as shown by a broken line in FIG. 4 to change an angle 115 formed by the first discharge port 103 and the second discharge port 104.

The nozzle 105 includes a paint supply port 107 to receive a supply of paint; a fluid supply port 108 to receive a supply of a fluid; an air supply port 109 for the first discharge port to receive a supply of a gas so as to spray the paint in a mist form from the first discharge port 103; and an air supply port 110 for the second discharge port to receive a supply of a gas so as to spray the paint in a mist form from the second discharge port 104.

The first discharge port 103 and the second discharge port 104 are located at positions that are not affected by an air flow to be generated from the blades 102 to perform flight. Specifically, the first discharge port 103 and the second discharge port 104 further extend outward from the flying object body 101 than the blades 102, to secure a length 114. In addition, valves may be installed inside the first discharge port 103 and the second discharge port 104 so as to adjust the discharge rate of the paint and the fluid to be discharged from the first discharge port 103 and the second discharge port 104.

As described above, the flying object 100 of the first embodiment includes the blades 101 that enable the flying object body 101 to fly; a paint ejection mechanism (including the first discharge port 103) that ejects the paint in a first direction; and a fluid ejection mechanism (including the second discharge port 104) that ejects the fluid in a second direction that is a direction opposite the first direction.

Here, in FIG. 1, the fluid ejection mechanism ejects (discharges) the fluid in the second direction that is a direction opposite the first direction; however, the present invention is not limited thereto, and the fluid ejection mechanism may eject the fluid in the second direction differing from the first direction by 90 degrees or more.

The flying object 100 includes the movable unit 106 that changes an angle formed by the paint ejection mechanism and the fluid ejection mechanism. The movable unit 106 changes the angle formed by the paint ejection mechanism and the fluid ejection mechanism, in a range of 135 degrees to 180 degrees. In addition, a tip of the paint ejection mechanism and a tip of the fluid ejection mechanism are located outside an end of the blades 102 with respect to the flying object body 101. Here, the "outside" means an outside of a space formed when rotation trajectories of the blades 102 are extended in a rotation axis direction of the blades 102.

In addition, the flying object 100 includes the nozzle 105 provided in the lower portion of the flying object body 101.

The paint ejection mechanism includes a first ejection port (first discharge port 103) provided at one end of the nozzle 105. The fluid ejection mechanism includes a second ejection port (second discharge port 104) provided at the other end of the nozzle 105.

A lower portion of the nozzle 105 is provided with the paint supply port 107 to which the paint is to be supplied, the fluid supply port 108 to which the fluid is to be supplied, a first gas supply port (air supply port 109 for the first discharge port) to which a first gas (air for the first discharge port) is to be supplied to eject the paint from the first ejection port (first discharge port 103), and a second gas supply port (air supply port 110 for the second discharge port) to which a second gas (air for the second discharge port) is to be supplied to eject the fluid from the second ejection port (second discharge port 104). In addition, the fluid to be ejected from the fluid ejection mechanism is, for example, any one of a gas, a liquid, and powder or a mixture thereof.

A configuration of a flying object system of the first embodiment will be described with reference to FIG. 5.

Paint 202 is to be transported from a paint supply container 204 to the paint supply port 107 of the flying object 100 via a paint hose 208. Air for the paint is to be transported from an air compressor 206 for the paint to the air supply port 109 for the first discharge port of the flying object 100 via an air compressor hose 210 for the paint.

The transported paint 202 and air are to be sprayed at the same time to paint an object 201 to be painted with the paint 202. A fluid 203 is to be transported from a fluid supply container 205 to the fluid supply port 108 of the flying object 100 via a fluid hose 209 at the same time when the paint 202 is ejected from the first discharge port 103.

Air for the fluid is to be transported from an air compressor 207 for the fluid to the air supply port 110 for the second discharge port of the flying object 100 via an air compressor hose 211 for the fluid. The paint hose 208, the fluid hose 209, the air compressor hose 210 for the paint, and the air compressor hose 211 for the fluid are used for the transport of the paint 202, the fluid 203, and air, but it is preferable that these hoses use a transport tube 212 to secure the flight stability of the flying object 100.

The transported fluid 203 and air are to be ejected from the second discharge port 110 at the same timing when the paint 202 is ejected from the first discharge port 103. In addition, the fluid 203 is to be ejected as the fluid 203 having a momentum equivalent to that of the paint 202 to be ejected from the first discharge port 109. Here, the momentum is a product of the weight of a discharged substance and a discharge speed.

As described above, the fluid 202 is also to be ejected from the second discharge port 104 at the same time when the paint 202 is ejected from the first discharge port 103, so that the flight of the flying object 100 can be stabilized, and a high-quality painted object can be obtained.

The second discharge port 104 is oriented in a direction opposite the paint 202 to be ejected from the first discharge port 103. The angle 115 formed by the first discharge port 103 and the second discharge port 104 had better be set to 100 to 180°. It is preferable that the angle 115 had better be set to 135 to 180°. Here, the formed angle 115 is an angle formed at an intersection of center lines of the first discharge port 103 and the second discharge port 104. This angle is defined as 0 to 180°, and may be variable during painting.

In order to make this angle variable, the movable unit 106 such as a ball joint or a hinge had better be provided in a portion connecting the first discharge port 103 and the second discharge port 104 or in a portion connecting the flying object body 101 and the first discharge port 103 or the second discharge port 104.

The movable unit 106 is capable of utilizing the discharge of the fluid 203 from the second discharge port 104 as a part of energy to move the flying object 100 upward, downward, rightward, and leftward. In addition, even when the flying object body 101 is inclined, the movable unit 106 prevents the first discharge port 103 from deviating from a position perpendicular to the object 201 to be painted, so that a stable high-quality painting surface without irregularities can be obtained.

As shown in FIG. 5, the paint 202 to be ejected from the first discharge port 103 can be transported from the container outside the flying object 100 through the transport tube 212 to be supplied to the first discharge port 103. At this time, the paint may be press-fed using a compressed gas, or may be transported using a pump.

In addition, as shown in FIG. 6, the paint 202, the fluid 203, and air may be stored in the containers provided in the flying object 100, to be supplied to the first discharge port 103 and the second discharge port 104. Specifically, as shown in FIG. 6, the lower portion of the nozzle 105 is provided with the paint supply container 204, the compressor 206 for the paint, the fluid supply container 205, and the compressor 207 for the fluid. The paint is to be transported from the paint supply container 204 to the paint supply port 107. The first gas is to be transported from the compressor 206 for the paint to the first gas supply port 109. The fluid is to be transported from the fluid supply container 205 to the fluid supply port 110. The second gas is to be transported from the compressor 207 for the fluid to the second gas supply port 110.

General paints such as oil paints, water paints, and powder paints can be used as the paint 202; however, the present invention is not limited thereto. The paint is the paint 202 to be discharged from the first discharge port 103 of the flying object 100, and the timing of discharge of the paint 202 may be continuous or intermittent; however, the present invention is not limited thereto. The paint 202 had better be ejected (discharged) as needed while a flight path of the flying object 100 is set according to the shape of the object 201 to be painted. Methods such as airless spraying, air spraying, and electrostatic painting can be used as a discharge method, and the discharge method is not limited as long as painting is performed without contact with the object 201 to be painted.

The fluid 203 is discharged from the second discharge port 104 according to the timing of discharge of the paint 202, so that the flight of the flying object 100 and a direction of the paint 202 to be discharged can be stabilized. The fluid 203 to be discharged from the second discharge port 104 may be a gas, a liquid, or powder. Examples of the fluid 202 include, for example, a single gas or a mixed gas such as air, nitrogen, or carbon dioxide, water, an organic solvent, or a mixed liquid, a mixture of the gas and the liquid, a mixture of the gas and solid particles such as a polymer, ceramics, or metal, a mixture of the liquid and the solid particles, and a mixture of the gas, the liquid, and the solid particles.

The fluid 203 to be discharged from the second discharge port 104 may be sprayed similarly to the paint 202 to be discharged from the first discharge port 103, may be discharged as a continuous fluid, or may be discharged in any form as long as the stability of the flying object 100 can be secured.

The controller 111 installed in the flying object 100 receives the radio wave 113 transmitted from the external controller 112, to determine a flight path. Incidentally, the flight path may be determined by GPS, or may be determined by programming determined in advance while a camera is mounted in the flying object 100 and recognizes the shape of the object 201 to be painted automatically. In addition, a worker may operate and fly the flying object 100 using a controller while watching a painting situation.

After the paint 202 adheres to the object 201 to be painted, a dry gas or a heating gas may be discharged from the first discharge port 103 or the second discharge port 104 to dry the paint painted on the object 201 to be painted.

In addition, as shown in FIG. 7, the painting time can also be further shortened by painting a plurality of places at once using a plurality of painting systems 300. In this case, the external controller 112 may be used alone, or a plurality of the external controllers 112 may be used.

As described above, the flying object system of the first embodiment includes the flying object 100, and the controllers 111 and 112 that adjust the timing of ejection of the paint 202 and the timing of ejection of the fluid 203. The controllers 111 and 112 control the rotation speed of the blades 102 to cause the flying object body 101 to fly.

In addition, the flying object system of the first embodiment includes a plurality of the flying objects 100, and the plurality of flying objects 100 are controlled by the controllers 111 and 112 to paint a plurality of places on the object 201 to be painted.

In addition, in a method for painting an object to be painted according to the first embodiment, the paint ejection mechanism ejects the paint 202 in the first direction to paint the object 201 to be painted in a non-contact manner.

According to the first embodiment, there is no need for capital investment on or an installation space for a scaffolding for a painting worker and a painting robot, and painting in high places can be performed safely and quickly while securing painting quality on an object to be painted. In addition, even when maintenance on a paint film is required, the maintenance time can be shortened, and a painted object can be provided quickly. For example, the operating time of a railway vehicle or a building can be increased.

Here, a reference comparative example for comparison with the first embodiment will be described.

As a general painting method, painting by hand or painting using a robot is performed. When a large object to be painted is painted by hand, the installation of a scaffolding is required, and a worker is required to wear a protective mask or protective glasses. In addition, variations in painting quality may be generated depending on the skill level of a worker, or a desired quality may not be achieved. In addition, when a robot is used, capital investment to introduce an expensive robot, securing an installation space, securing a robot storage space for drying, or improving the heat resistance of the robot is required.

In the case of painting using a flying object, the discharge rate of paint is suppressed to make the flying object fly safely, or the flight is not stable since a flying object body receives a reaction when the paint is discharged, so that the workability is reduced, and a paint film is difficult to form in a short time.

Second Embodiment

A second embodiment will be described with reference to FIG. 8. The second embodiment is such that the first embodiment is applied to a railway vehicle. FIG. 8 is a side view of a railway vehicle to which painting is applied.

As shown in FIG. 8, in an exterior wall of a railway vehicle 301, a side surface portion 405 and an upper surface portion that is a ceiling are formed of a processed material obtained by processing a metal sheet. The side surface portion 405 of the railway vehicle 401 is provided with a door portion 403 that is an opening and closing door, and a window portion 304. In addition, the upper surface portion of the railway vehicle 401 is provided with a pantograph 406. The railway vehicle 401 is provided with a wheel 402.

A paint film is to be formed on the exterior wall of the railway vehicle 401 by the above-described painting. A surface of the metal material is covered with the paint film of the embodiments physically to protect the surface of the metal material, and to prevent foreign matter, rainwater, etc. from coming into direct contact with the surface of the metal material. For this reason, the generation of metal corrosion on the surface of the metal material can be effectively prevented.

Further, design can be given to the railway vehicle by using a colored topcoat.

Hereinbelow, examples will be described with reference to FIG. 9. In the examples, the above-described painting will be specifically described.

Example 1

First, an aluminum sheet was prepared as the object 201 to be painted shown in FIG. 5. Specifically, a 6N01 alloy was used among Al—Mg—Si alloys (6000 series aluminum alloys). The size was 1 m in length×1.2 m in width and 2 mm in thickness.

First, a blasting process was performed to secure adhesion between an object to be painted and a paint film. The blasting process was performed by blowing crushed steel particles having a particle size of 0.5 mm as a grinding material on the aluminum sheet at a projection speed of 35 m/s. After the blowing was completed, air blowing was performed, and it was visually confirmed that there were no remaining grinding material.

The aluminum sheet of the object to be painted was erected vertically and installed such that an upper end of the aluminum sheet was located 4 m above the ground. Primer painting was performed to prevent corrosion of the object to be painted. For the primer painting, Uniepoc 30 Primer NC Red Rust Paint Liquid (produced by Nippon Paint) and Uniepoc 30 Primer Hardener (produced by Nippon Paint) were mixed at a weight ratio of 6:1. The liquid mixture was adjusted to a viscosity appropriate for painting with a thinner, and was put into a pressurized container, the container was pressurized with air to pressure-feed the paint to the first discharge port of the flying object, so that the paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, water was sprayed from the second discharge port at a discharge rate of 310 mL/min with air at an air flow rate of 195 L/min. The time required for painting at this time was 100 seconds. Drying was performed naturally at room temperature for 16 hours.

For intermediate coat painting, NAX Mighty Rack G-IIKB type (produced by Nippon Paint) and NAX Mighty Rack G-IIKB type Hardener (produced by Nippon Paint) were mixed at a weight ratio of 4:1. The liquid mixture was adjusted to an appropriate viscosity with NAX Mighty Rack G-II500 Standard Thinner, and the paint was sprayed from the first discharge port having a nozzle diameter of 1.3 mm of the flying object at a paint flow rate of 310 mL/min with air at an air flow rate of 195 L/min so as to form a film thickness of approximately 50 μm. At this time, water was sprayed from the second discharge port at a flow rate of 310 mL/min with air at an air flow rate of 195 L/min. The time required for painting at this time was 120 seconds. Drying was performed naturally at room temperature for 16 hours.

After the intermediate coat was dried, the surface was smoothed by performing polishing using #400 abrasive paper until the film thickness reached approximately 40 μm.

For topcoat painting, NAX Mighty Rack G-IIKB type (produced by Nippon Paint) and NAX Mighty Rack G-IIKB type Hardener (manufactured by Nippon Paint), which are the same paints as the intermediate coat, were mixed at a weight ratio of 4:1. The liquid mixture was adjusted to an appropriate viscosity with NAX Mighty Rack G-II500 Standard Thinner, and the paint was sprayed from the first discharge port having a nozzle diameter of 1.3 mm of the flying object at a paint flow rate of 310 mL/min with air at an air flow rate of 195 L/min so as to form a film thickness of approximately 50 μm. At this time, water was sprayed from the second discharge port at a flow rate of 310 mL/min with air at an air flow rate of 195 L/min. The time required for painting at this time was 100 seconds. Drying was performed naturally at room temperature for 16 hours. When the obtained paint film was visually checked, it was confirmed that the film had no irregularities, cracking, and peeling.

The paint film obtained by the above steps was evaluated for adhesion, impact resistance, and scratch hardness by the following method. Evaluation results are shown in FIG. 9.

Incidentally, adhesion, impact resistance, and scratch hardness were evaluated also in Examples 2 to 10 and Comparative Examples 1 and 2 according to the same criteria as the following evaluation criteria.

(Appearance)

The appearance of the paint film was evaluated as follows. In a visual inspection, a case where the paint film was glossy, had no defects, and was smooth was denoted by "○", a case where the paint film had low gloss, defects, or a rough surface was denoted by "Δ", and a case where the paint film had no gloss, had large defects and severe irregularities was denoted by "x".

(Adhesion)

The adhesion of the paint film to the aluminum sheet was evaluated as follows. First, cuts reaching the aluminum sheet were formed in a grid pattern on the paint film. Specifically, 11 linear cuts were formed in each of a longitudinal direction and a lateral direction using a cutter knife, so as to intersect each other. The linear cuts were formed at an interval of 2 mm. Accordingly, a total of 100 2 mm×2 mm squares each surrounded by the cuts were formed on the paint film. In other words, the paint film was formed which was divided into 20 mm×20 mm regions in a grid pattern by the linear cuts.

Next, cellophane tape was caused to adhere to the regions in a grid pattern on the paint film, and then the cellophane tape was pulled upward at once and peeled off. The work of adhering and peeling of the cellophane tape was repeated three times. As a result, the area of a peeled portion of the paint film in the regions divided in a grid pattern was visually calculated, and a ratio of the area of the peeled portion to the entire area of the regions in a grid pattern was calculated as a defect rate (peeling rate). The obtained defect rate (peeling rate) was used to determine whether or not adhesion was acceptable according to the following criteria. A case where the defect rate was 0% was denoted by "○", a case where the defect rate was more than 0% and less than 15% was denoted by "Δ", and a case where the defect rate was 15% or more was denoted by "x".

As described above, the obtained paint film was evaluated for appearance and adhesion. The evaluation results are shown in FIG. 9.

In addition, also in Example 2, the same evaluation is performed for each evaluation item, and the evaluation results are shown in FIG. 9.

Example 2

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, water was sprayed from the second discharge port at 561 mL/min. As for others, a paint film was formed on the aluminum sheet in the same manner as in Example 1.

Example 3

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, air was sprayed from the second discharge port at an air flow rate of 435 L/min. As for others, a paint film was formed on the aluminum sheet in the same manner as in Example 1.

Example 4

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, ethylene glycol was sprayed from the second discharge port at a discharge rate of 285 mL/min with air at an air flow rate of 195 L/min. As for others, a paint film was formed on the aluminum sheet in the same manner as in Example 1.

Example 5

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, alumina particles were sprayed from the second discharge port at a discharge rate of 320 g/min with air at an air flow rate of 195 L/min. As for others, a paint film was formed on the aluminum sheet in the same manner as in Example 1.

Example 6

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, a 20 wt % slurry in which alumina particles were dispersed in water were sprayed from the second discharge port at a discharge rate of 195 mL/min with air at an air flow rate of 195 L/min. As for others, a paint film was formed on the aluminum sheet in the same manner as in Example 1.

Example 7

The paint was sprayed from the first discharge port having a nozzle diameter of 1.3 mm of the flying object at a paint discharge rate of 310 mL/min with air at an air flow rate of 195 L/min so as to form a film thickness of approximately 50 μm. At this time, water was sprayed from the second discharge port at a discharge rate of 360 mL/min with air at an air flow rate of 225 L/min, and a horizontal angle and a vertical angle formed by the first discharge port and the second discharge port were set to 150° and 180°, respectively. As for others, a paint film was formed on the aluminum sheet in the same manner as in Example 1.

Example 8

A paint film was formed on the aluminum sheet in the same manner as in Example 1 except that a topcoat paint was put into a spray gun carrying a suction type paint cup of 500 mL under the flying object body, and that the paint cup is carried in the flying object.

Example 9

A paint film was formed on the aluminum sheet in the same manner as in Example 1 except that the topcoat paint was changed to IHT7200 (produced by Axalta), which is a water paint.

Example 10

The exterior wall of the railway vehicle 401 shown in FIG. 8 was used as an object 1 to be painted. As for others, a paint film was formed in the same manner as in Example 1. The exterior wall of the railway vehicle 401 was made of aluminum. In such an exterior wall of the railway vehicle 401, a paint film was formed on the side surface portion 405 in the same manner as in Example 1. The railway vehicle 401 was used as a normal traveling vehicle in an in-house test facility for three months. In the railway vehicle 401 after use for three months, the paint films formed in regions A1 and A2 were evaluated for adhesion and scratch hardness in the same manner as in Example 1.

Comparative Example 1

The same aluminum sheet as the one used in Example 1 was used as an object to be painted, and a blasting process was performed on the aluminum sheet in the same manner as in Example 1. In primer painting, intermediate coat painting, and topcoat painting, painting and drying were performed under the same conditions as in Example 1 except that a fluid was not discharged from the second discharge port. When the obtained paint film was visually checked, it was confirmed that there were many irregularities and partially non-glossy places.

Comparative Example 2

The same aluminum sheet as the one used in Example 1 was used as an object to be painted, and a blasting process was performed on the aluminum sheet in the same manner as in Example 1. Similarly to Comparative Example 2, in primer painting, intermediate coat painting, and topcoat painting, a fluid was not discharged from the second discharge port. The paint was sprayed from the first discharge port having a nozzle diameter of 0.5 mm at a paint discharge rate of 20 mL/min with air at an air flow rate of 19 L/min in a state where the flying object was capable of flying stably, so as to form a film thickness of approximately 50 μm. As for others, paining and drying were performed under the same conditions as in Example 1.

The time required for painting was 1,600 seconds for the primer painting, 1,900 seconds for the intermediate coat painting, and 1,600 seconds for the topcoat painting, and a lot of time was required. In addition, when the obtained paint film was visually checked, irregularities and roughness were confirmed, and adhesion was reduced.

Comparison Between Examples and Comparison Examples

According to Examples 1 to 9, in painting using the flying object, the time required for painting could be shortened, and a high-quality paint film could be obtained without depending on the type of paint and the type of a fluid by the flying object including the first discharge port to discharge the paint and the second discharge port to discharge the fluid having the same momentum in a direction opposite the first discharge port.

In addition, in Example 10, when the appearance of the paint film on the exterior wall of the railway vehicle after use for three months was visually checked, no breakage such as cracking or peeling was confirmed.

On the other hand, in Comparative Example 1, the flying object lacked flight stability since painting was performed without discharging a fluid from the second discharge port, and the light and shade of painting was generated since the first discharge port fluctuated, so that irregularities were generated and non-paintable places were generated to cause a problem in the formation of a paint film. In Comparative Example 2, in order to make the flying object fly stably without discharging a fluid from the second discharge port, painting was performed while significantly reducing the paint discharge rate, and a lot of time was required for painting, and no defects were seen but irregularities or roughness was generated, thereby causing a problem in the formation of a paint film.

Incidentally, the present invention is also applicable to railway vehicles, construction machines, or buildings as an object to be painted, that require a scaffolding, etc. when a person performs painting, and that require a robot, moving the object to be painted, a large robot, etc. when the robot performs painting.

Further, the present invention is also applicable to the field of power generation equipment such as large solar power generation devices, solar power generation modules, wind power generators, or wind power generation modules to be used outdoors.

Incidentally, in the first embodiment, as shown in FIG. 1, the fluid ejection mechanism ejects the fluid in the second direction that is a direction opposite the first direction, and the "second direction that is a direction opposite the first direction" may slightly deviate from 180 degrees with respect to the opposite direction. In addition, when a plurality of the fluid ejection mechanisms are provided, an ejection direction of each of the fluid ejection mechanisms does not need to be a direction rotated by 180 degrees from an ejection direction of the paint ejection mechanism (for example, the paint may be ejected at 0 degrees and the fluid may be ejected at 120 degrees and at −120 degrees). Any ejection direction may be adopted as long as the sum of ejection forces of the ejection mechanisms is substantially zero.

REFERENCE SIGNS LIST

100 Flying object
101 Flying object body
102 Blade
103 First discharge port
104 Second discharge port
105 Nozzle
106 Movable unit
107 Paint supply port
108 Fluid supply port
109 Air supply port for first discharge port
110 Air supply port for second discharge port
111 Controller
112 External controller
113 Radio wave
201 Object to be painted
202 Paint
203 Fluid
204 Paint supply container
205 Fluid supply container
206 Air compressor for first discharge port
207 Air compressor for second discharge port
208 Paint hose
209 Fluid hose
210 Air compressor hose for paint
211 Air compressor hose for fluid
300 Painting system
301 Painting system holding paint, fluid, and air containers
401 Railway vehicle
402 Wheel
403 Door portion
404 Window portion
405 Side surface portion
406 Pantograph

The invention claimed is:

1. A flying object comprising:
a flying object body;
a blade that enables the flying object body to fly;
a paint ejection mechanism that ejects paint in a first direction at a first discharge rate;
a fluid ejection mechanism that ejects a fluid in a second direction differing from the first direction by 90 degrees or more at a second discharge rate, wherein the second discharge rate is determined based on the first direction, the first discharge rate, and the second direction, such that flight of the flying object is stabilized; and
a nozzle provided in a lower portion of the flying object body,
wherein the paint ejection mechanism includes a first ejection port provided at one end of the nozzle, and the fluid ejection mechanism includes a second ejection port provided at the other end of the nozzle;
wherein the one end of the nozzle and the other end of the nozzle are disposed outside of outer ends of the flying object body and outside of a rotational axis of the blade; and
wherein a bottom surface of a lower portion of the nozzle is provided with a paint supply port configured to receive the paint supplied to the flying object from a paint supply container that is external to the flying object, a fluid supply port configured to receive the fluid supplied to the flying object from a fluid supply container that is external to the flying object, a first gas supply port configured to receive a first gas supplied to the flying object from a first air compressor that is external to the flying object to eject the paint from the first ejection port, and a second gas supply port configured to receive a second gas supplied to the flying object from a second air compressor that is external to the flying object to eject the fluid from the second ejection port.

2. The flying object according to claim 1, further comprising:

a movable unit that changes an angle formed by the paint ejection mechanism and the fluid ejection mechanism.

3. The flying object according to claim 2, wherein the movable unit changes the angle formed by the paint ejection mechanism and the fluid ejection mechanism, in a range of 135 degrees to 180 degrees.

4. The flying object according to claim 1, wherein a tip of the paint ejection mechanism and a tip of the fluid ejection mechanism are located outside an end of the blade with respect to the flying object body.

5. The flying object according to claim 1, wherein the fluid to be ejected from the fluid ejection mechanism is any one of a gas, a liquid, and powder or a mixture of the gas, the liquid, and the powder.

6. A flying object system comprising:

the flying object according to claim 1; and a controller that adjusts a timing of ejection of the paint and a timing of ejection of the fluid.

7. The flying object system according to claim 6, wherein the controller controls a rotation speed of the blade to cause the flying object body to fly.

8. A flying object system comprising:

the flying object according to claim 1; and wherein the paint is to be transported from the paint supply container to the paint supply port via a paint hose, the first gas is to be transported from the first air compressor for the paint to the first gas supply port via a first gas hose, the fluid is to be transported from the fluid supply container to the fluid supply port via a fluid hose, and the second gas is to be transported from the second air compressor for the fluid to the second gas supply port via a second gas hose.

9. The flying object system according to claim 6, further comprising:

a plurality of the flying objects, wherein the plurality of flying objects are controlled by the controller to paint a plurality of places on an object to be painted.

10. The flying object according to claim 1, wherein the second direction is a direction opposite the first direction.

11. A method for painting an object to be painted using the flying object according to claim 1, wherein the paint ejection mechanism ejects the paint in the first direction to paint the object to be painted in a non-contact manner.

12. A method for painting an object to be painted using the flying object according to claim 10, wherein the paint ejection mechanism ejects the paint in the first direction to paint the object to be painted in a non-contact manner.

13. The flying object according to claim 1, wherein the first discharge rate of the paint and the second discharge rate of the fluid are adjustable.

14. The flying object according to claim 1, wherein a diameter of a discharge nozzle of the first ejection port is 1.3 mm.

15. The flying object according to claim 14, wherein a diameter of a discharge nozzle of the second ejection port is 1.3 mm.

\* \* \* \* \*